United States Patent [19]

Koontz

[11] 4,361,430
[45] Nov. 30, 1982

[54] METHOD OF AND APPARATUS FOR SELECTIVELY HEATING MOLTEN GLASS STREAM MARGINAL EDGES

[75] Inventor: Harry S. Koontz, Pittsburgh, Pa.

[73] Assignee: PPG Industries, Inc., Pittsburgh, Pa.

[21] Appl. No.: 265,295

[22] Filed: May 20, 1981

[51] Int. Cl.³ ............................................. C03B 18/10
[52] U.S. Cl. ..................... 65/99.5; 65/99.3; 65/135; 65/136; 65/182.4
[58] Field of Search ............... 65/182.4, 182.1, 99.2, 65/99.5, 99.6, 99.3, 135, 136, 337

[56] References Cited

U.S. PATENT DOCUMENTS

| | | | |
|---|---|---|---|
| 2,413,037 | 12/1946 | DeVoe | 13/6 |
| 2,533,773 | 10/1970 | Fujimoto et al. | 65/182 |
| 3,233,995 | 2/1966 | Javaux | 65/182.4 |
| 3,445,214 | 5/1969 | Ormesher | 65/99 |
| 3,450,516 | 6/1969 | Emhiser et al. | 65/99 |
| 3,622,299 | 11/1971 | Swillinger | 65/182.1 |
| 3,930,827 | 1/1976 | Pollock | 65/65 A |
| 3,973,940 | 8/1976 | Edge et al. | 65/65 A |
| 3,976,460 | 8/1976 | Kompare et al. | 65/32 |
| 4,029,488 | 6/1977 | Rhett | 65/135 |

OTHER PUBLICATIONS

Marketing Brochure, Thermcraft, Inc., for High Temperature Electric Heaters, Winston-Salem, NC.

Primary Examiner—Arthur D. Kellogg
Attorney, Agent, or Firm—Dennis G. Millman; Donald Carl Lepiane; Lee Patch

[57] ABSTRACT

Apparatus for selectively heating marginal edge portions of a stream of molten glass includes at least two independent heating elements presenting a substantially planar heating face toward the marginal edge of a stream of molten glass flowing in close proximity thereunder. A first set of the heating elements overlies a portion of the marginal edge adjacent a containing sidewall and the second set is positioned inboard of the first set relative to the central portion of the stream. Generated heat is directed primarily downward, e.g., greater than about fifty percent, and preferably greater than seventy-five percent toward first and second distinct areas of the marginal edge by a thermal insulating barrier positioned over the heating elements, to provide first and second localized zones of heating. The heating elements may be cantilevered through the sidewall in close proximity to the stream of molten glass.

20 Claims, 6 Drawing Figures

METHOD OF AND APPARATUS FOR SELECTIVELY HEATING MOLTEN GLASS STREAM MARGINAL EDGES

BACKGROUND OF THE INVENTION

1. Field of the Invention

This invention relates to a method of making glass in which a molten glass stream flows through a chamber between opposed sidewalls, wherein the marginal edge portions of such a molten glass stream are selectively heated to control the temperature profile thereacross.

2. Discussion of the Technical Problem

In the production of flat glass, glass batch materials are melted in a glass melting furnace and the molten glass is caused to flow downstream through a conditioner region and a canal region to a glass forming chamber. Within the glass forming chamber the molten glass is commonly supported upon a pool of molten metal, cooled, and acted upon to produce a stable ribbon of glass of the desired thickness, width, and optical quality.

Due to heat losses through the sidewalls of the conditioner region, canal region, and glass forming chamber, the stream of molten glass commonly exhibits a transverse temperature profile, i.e., a temperature profile across the width of the stream, in which the central portions of the stream are maintained at a higher temperature than marginal edge portions thereof. In the conditioner region and canal region of the system such a transverse temperature profile may produce undesirable flow characteristics and nonuniform erosion of the refractory members e.g., a threshold and/or tweel, in contact with the molten glass stream. In the glass forming chamber where attenuating forces are commonly exerted upon the stream, such a transverse temperature profile may produce undesirable thickness variations and optical distortions in the final product. These undesirable effects become more pronounced as the width of the respective chambers is increased, due to the more pronounced temperature gradient which tends to result.

U.S. Pat. No. 3,445,214 to Ormesher teaches facilities by which localized areas of a ribbon of glass supported upon a pool of molten metal may be heated. Generally, electrical currents are passed from an overlying electrode through the thickness of the glass ribbon to the underlying molten metal pool, which serves as the opposite electrode, to minimize heat losses from the marginal edges of the glass ribbon. The patent is limited in its applicability, however, to relatively high temperature regions of a glass forming chamber, where the glass is sufficiently electrically conductive while it is supported on a molten metal pool.

U.S. Pat. No. 3,533,773 to Fujimoto et al. teaches facilities for heating the marginal edge portions of a stream of molten glass which include a graphite electrical heating element which may be suspended over a marginal edge portion of the stream within a canal region or a glass forming chamber. However, because the heating element directs heat both toward and away from the glass to be heated in equal proportions, its operating efficiency is diminished. Additionally, the heating element is limited in its capacity to counter a transverse temperature profile having a smooth gradient of temperature change from center to marginal edge of the stream of molten glass, because it generally provides only a single, uniformly powered heating zone along the marginal edge portion of the stream, rather than a plurality of independent heating zones spaced between a sidewall and the center portion of the stream.

U.S. Pat. No. 3,973,940 to Edge et al. teaches a method of delivery of a stream of molten glass onto a molten metal pool which provides for substantially uniform flow rates across the width of the stream of molten glass. The transverse temperature profile of the stream of molten glass is controlled in the canal region by a plurality of transversely aligned heating elements. The heating elements disclosed are vertically suspended, generally U-shaped elements which are controlled in response to the tweel position to maintain the relative marginal and central stream flow rates within a prescribed range. The heating elements are limited, however, because the heat which is generated is not effectively directed toward selected portions of the stream of molten glass which are to be heated. It would be advantageous to have a method of and an apparatus for selectively and efficiently heating a marginal edge portion of a stream of molten glass, to diminish nonuniform transverse temperature profiles existing in the stream.

SUMMARY OF THE INVENTION

The present invention provides a method of selectively heating a marginal edge portion of a stream of molten glass flowing through a chamber between opposed sidewalls which may be practiced in a conditioner region, canal region and/or a glass forming chamber of a glass producing facility, to diminish or eliminate the difficulties arising from an undesirable transverse temperature profile in the steam of molten glass. The method includes the steps of suspending a first heating element over and in close proximity to the surface of the marginal edge portion to be heated, generating heat therefrom at a first preselected rate, and directing the first generated heat primarily, e.g., greater than about fifty percent thereof, downwardly toward a first distinct area of the marginal edge portion located adjacent one of the sidewalls of the chamber, to provide a first localized zone of heating. A second heating element is also suspended over and in close proximity to the surface of the marginal edge portion and heat is generated therefrom at a second preselected rate. The second generated heat is primarily downwardly directed toward a second distinct area of the marginal edge located generally between the first distinct area and the central portion of the stream to provide a second localized zone of heating. Preferably, greater than about seventy-five percent of generated heat is downwardly directed, and preferably the first preselected rate exceeds the second preselected rate of heat generation, in order that a glass stream's decreasing gradient of temperature from center to marginal edge portion may be countered with localized heating zones of increasing temperatures. In a preferred method, the heating elements are suspended through an opening in the chamber sidewall less than about three inches (7.6 cm) from the surface of the stream of molten glass, and in combination generate downwardly directed heat at a rate greater than about twenty kilowatts (66,000 BTU/hr.).

The present invention further provides appartus for selectively heating a marginal edge portion of a stream of molten glass flowing through a conditioner region, canal region, and/or a glass forming chamber of a glass producing facility. The apparatus includes at least two heating elements; facilities for supporting the two heating elements over and in close proximity to the surface of the marginal edge portion to be heated with the first heating element positionable outboard of the second heating element with respect to the central portion of the stream of molten glass; and facilities for directing the heat generated by the first and second heating elements primarily downwardly toward first and second distinct areas along the surface of the marginal edge portion of the stream to provide first and second localized zones of heating. The heating elements are preferably electrical resistance coils, each having independent electrical powering facilities and independent temperature sensing facilities.

The heating elements of the present invention are preferably supported within the inboard portion of a refractory housing member. The inboard portion includes a lower portion having downwardly open elongated channels in which the heating elements are supported and an upper portion which establishes a thermal insulating barrier to direct generated heat downwardly toward the surface of the marginal edge portion.

The refractory housing member further includes a central portion which is positionable within an opening in a chamber sidewall and an outboard portion which is positionable outside the chamber sidewall. Preferably the inboard, central and outboard portions of the refractory housing member are so oriented and balanced that the chamber sidewall provides the sole source of support to the housing member when the inboard portion thereof is cantilevered in close proximity over the marginal edge portion of the stream of molten glass.

DESCRIPTION OF THE FIGURES

FIG. 6 is a plan view of the surface of the glass stream showing distinct planar heatng areas which are generated in the practice of the present invention.

DESCRIPTION OF THE PREFERRED EMBODIMENTS

Figure 1:
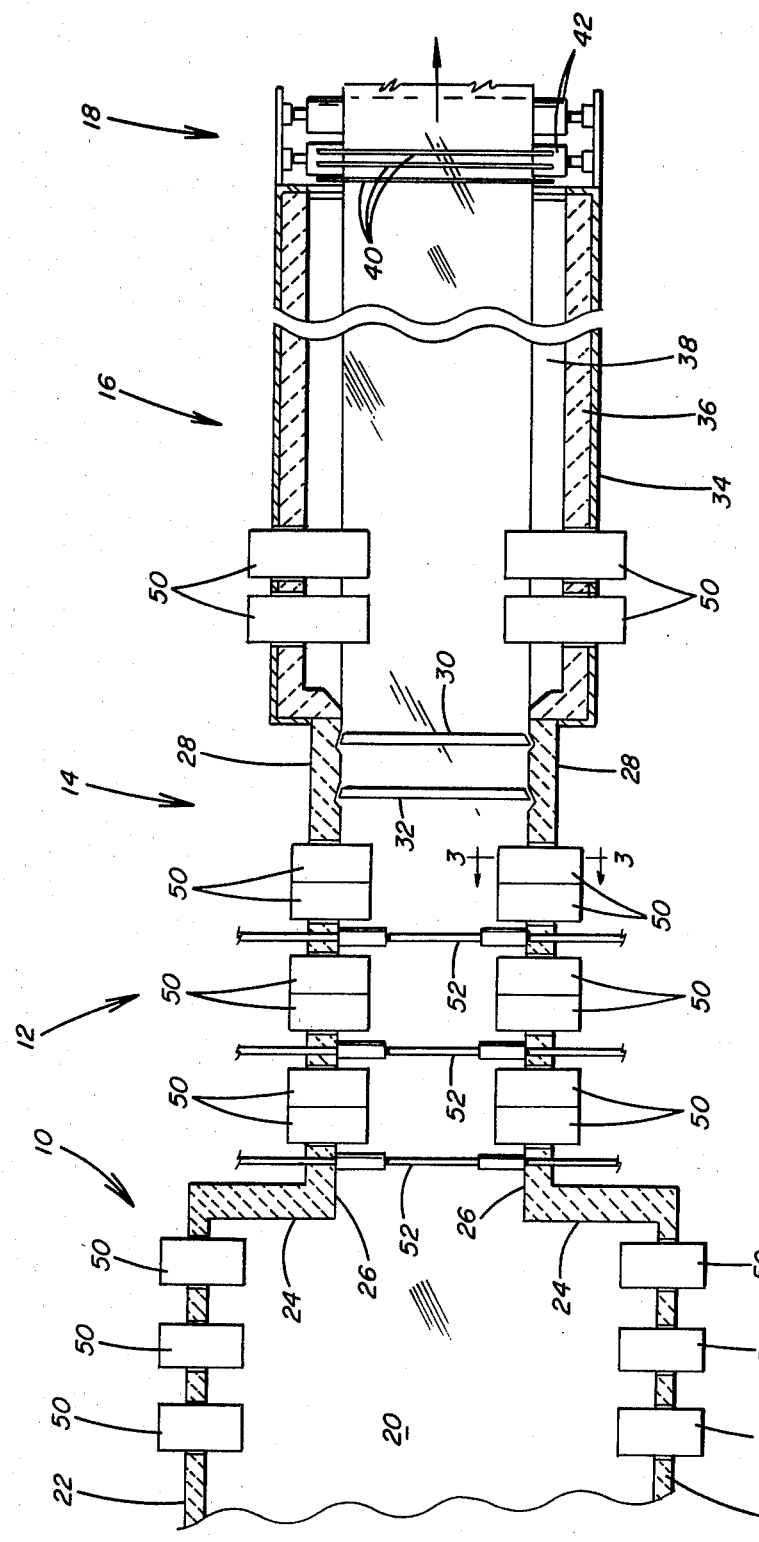
FIG. 1 is a sectional view of an apparatus for producing flat glass which incorporates features of the present invention.

Referring to FIG. 1, there is shown a flat glass producing facility including a conditioner region 10 of a glass melting furnace, a canal region 12, a delivery facility 14, a forming chamber 16, and a glass removal facility 18.

The glass melting furnace includes a melting section (not shown) where glass batch materials are melted to form a pool of molten glass and a conditioner region 10 where a stream of molten glass 20 is removed from the pool of molten glass and conditioned for subsequent treatment in the forming chamber 16. The conditioner region 10 includes opposed refractory sidewalls 22, refractory endwalls 24, a refractory bottom (not shown) and a refractory roof (not shown).

The stream of molten glass 20 flows downstream from the conditioner region 10 into the canal region 12 where it may be further prepared for subsequent treatment. The canal region 12 includes refractory sidewalls 26 and refractory bottom 27 (shown only in FIG. 2) within which the stream of molten glass 20 flows toward the delivery facility 14.

The delivery facility 14 generally includes a pair of jambs 28 between which extends a metering device or tweel 30 and a threshold assembly (not shown). The lower surface of the tweel 30, the upper surface of the threshold (not shown) and the inner faces of the jambs 28 define an opening through which a layer of molten glass may be delivered to the forming chamber 16. A second tweel 32 is positioned upstream of the tweel 30 to serve as a backup to limit or close off glass flow in the event maintenance is required in the regions downstream thereto. The delivery facility 14 may be of the type taught in U.S. Pat. Nos. 3,854,922; 3,884,665; 3,898,069, and 4,062,666; which teachings are incorporated by reference herein.

The forming chamber 16 comprises a substantially impervious metal casing 34 into which is disposed a refractory bottom (not shown) and refractory sidewalls 36. The refractory bottom and refractory sidewalls 36 define a container for holding a pool of molten metal 38.

At the downstream end of the forming chamber 16 is a glass removal facility 18 for withdrawing a continuous ribbon of glass from the forming chamber 16. The glass removal facility 18 generally includes curtains 40 and liftoff rolls 42 mounted in a position to lift and convey the glass ribbon from the forming chamber 16 to an annealing lehr (not shown).

As briefly discussed hereinbefore, the stream of molten glass 20 may exhibit an undesirable transverse temperature profile, i.e., higher central portion temperatures and lower marginal edge portion temperatures with a generally smooth gradient therebetween, during its downstream flow from the melting furnace toward the glass removal facility 18. In the conditioner region 10, such an undesirable condition may produce undesirable flow characteristics and glass stagnation in corner areas. Within the canal region 12 and delivery facility 14 such a condition may produce undesirable flow characteristics, nonuniform threshold and tweel erosion, and devitrification of glass along the marginal edges of the stream. Within the forming chamber 16, where longitudinal and transverse tractive forces are generally applied to the glass, such a condition may produce thickness nonuniformity and optical distortion in the final product.

According to the present invention, there is provided a method of diminishing or eliminating the undesirable transverse temperature profile of the stream of molten glass, by selectively heating the marginal edge portions thereof, while optionally simultaneously cooling the central portions. Referring to FIG. 1, there is shown a plurality of opposed pairs of heaters 50 positioned through the sidewalls 22, 26, and 36 of the conditioner region 10, canal region 12, and forming chamber 16, respectively. Also shown in the canal region 12 are preferred coolers 52. The heaters 50 are provided with facilities for selectively heating the marginal edge portions of the stream of molten glass and, in conjunction with coolers 52, may be utilized to alleviate the above-described difficulties associated with a nonuniform transverse temperature profile. The description of the present invention which follows will be specifically directed to the canal region 12, but except as hereinafter noted, the description will apply equally to the conditioner region 10 and the forming chamber 16.

Figure 2:
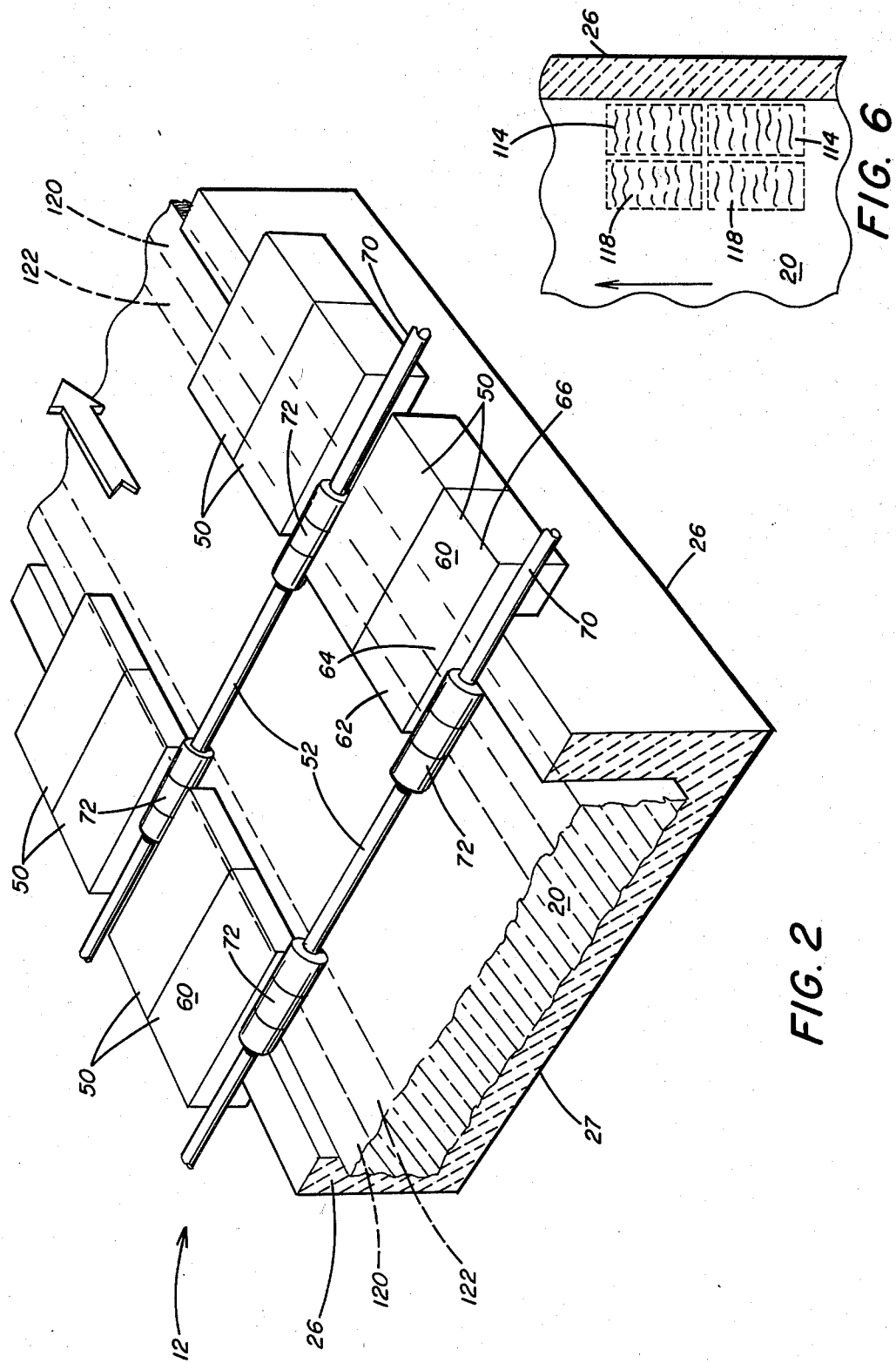
FIG. 2 is an isometric view of the canal region of a glass producing apparatus of FIG. 1, incorporating features of the present invention.

Referring now to FIGS. 1 and 2, there is shown a preferred arrangement of heaters 50 and coolers 52, generally consisting of adjacent pairs of opposed heaters 50 with interspaced coolers 52 therebetween. Heaters 50 generally include a housing member 60 which has an inboard portion 62 which is inserted through the sidewall 26 into the canal region 12; a central portion 64 which is positionable within an opening of the sidewall 26 located above the level of the stream of molten glass 20; and an outboard portion 66 positionable outside the sidewall 26. The housing member 60 is preferably formed of a refractory material selected to be compatible with the hostile environment of the canal region 12, e.g., a high alumina content refractory. The refractory material selected is preferably free from all materials which are reactive with the heating elements used in the practice of the present invention, which are discussed more fully below. As will be appreciated from FIGS. 2 and 3, the inboard portion 62, central portion 64, and outboard portion 66 of the heater 50 are so oriented and balanced that the sidewall 26 provides the sole source of support for the housing member 60 when the inboard portion 62 is cantilevered into the chamber in close proximity to the surface of the stream of molten glass 20.

With continued reference to FIGS. 1 and 2, the coolers 52 generally comprise an elongated conduit 70 which extends over and transverse to the flow of the stream of molten glass 20. Thermal insulating sleeves 72 are positioned about the conduit 70 within the canal region 12 adjacent the marginal edge portions of the stream of molten glass 20, and cooling fluid, e.g., water, is passed through the conduits 70. The thermal sleeves 72 serve to isolate the cooling effect of the cooling fluid passage from the marginal edge portions of the stream and thereby localize it in the central regions of the stream. As will be discussed more fully below, the combined effects of the heaters 50 and the coolers 52 will tend to make uniform or flatten the transverse temperature profile of the stream of molten glass 20.

Figure 3:
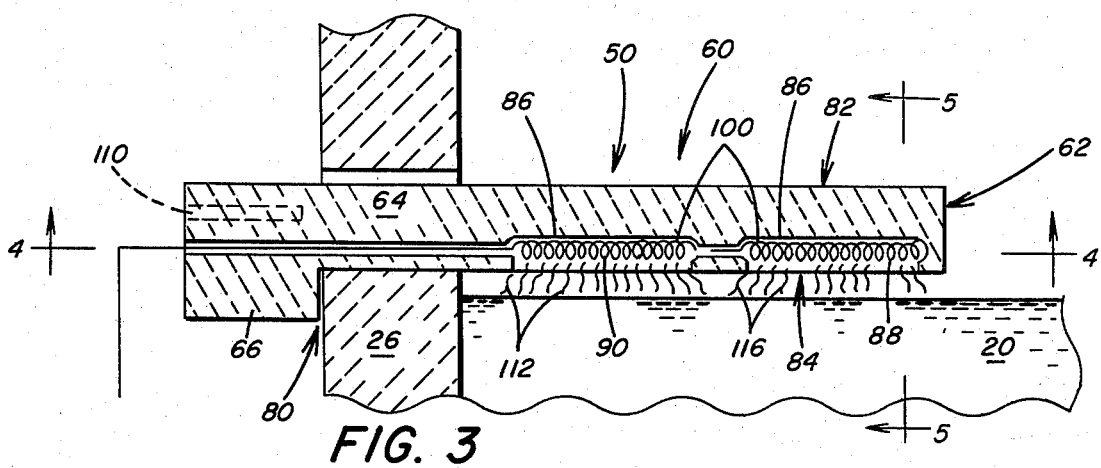
FIG. 3 is a elevational view taken along line 3—3 of FIG. 1, showing a selective marginal edge portion heating device incorporating features of the present invention.

Referring now to FIG. 3, a heater 50 is more clearly shown in its operating position relative to the sidewall 26 and the stream of molten glass 20. The inboard portion 62 is generally cantilevered over and in close proximity to the surface of the stream, with the housing member 60 balanced upon and fully supported by the upper surface of the opening in the sidewall 26. Preferably a downwardly extending lip 80 is provided along the outboard portion 66 which abuts with the outer surface of the sidewall 26 when the heater 50 is properly positioned relative thereto.

Figure 4:
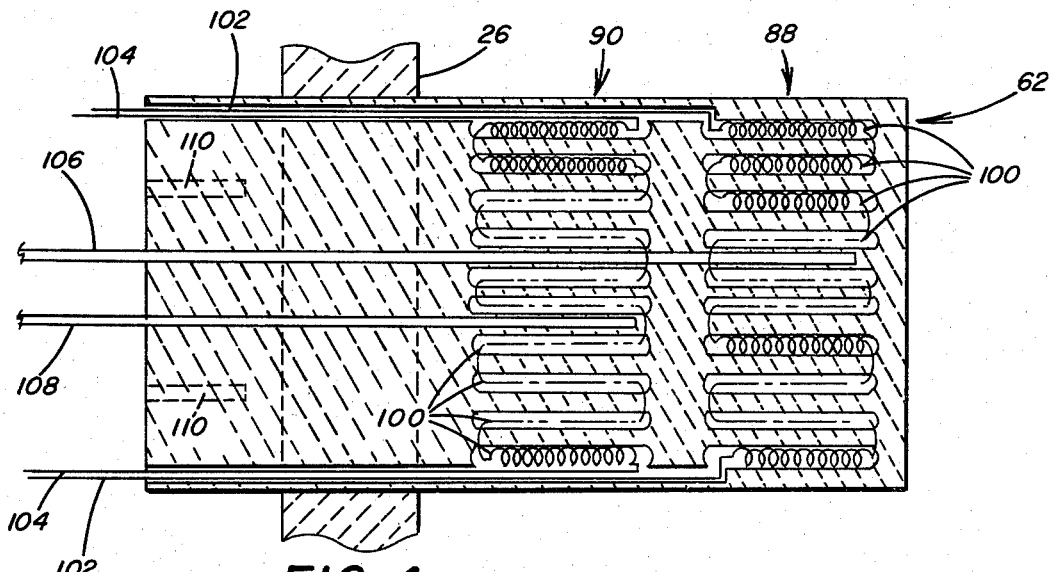
FIG. 4 is a view taken along line 4—4 of FIG. 3.
Figure 5:
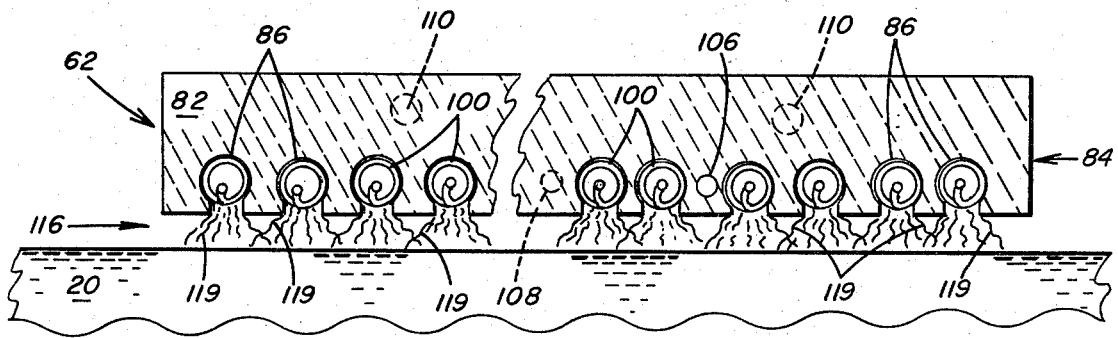
FIG. 5 is a view taken along line 5—5 of FIG. 3.

With continued reference to FIG. 3 and also referring to FIGS. 4, and 5, the inboard portion 62 of the housing member 60 generally includes an upper portion 82 and a lower portion 84. The lower portion 84 preferably presents a substantially planar heating face toward the surface of the stream of molten glass 20, "substantially planar" as used herein being defined to include moderately convex and moderately concave surfaces, in order to localize generated heat on distinct area of the surface of the stream of molten glass. The lower portion 84 includes a plurality of elongated, downwardly opened channels 86 in which an inboard set 88 of electrical resistance heating coils 100 and an outboard set 90 of electrical resistance heating coils 100 are mounted. The channels 86 have an inner diameter which is greater than the outer diameter of the heating coils 100 and downwardly facing openings with a width less than the outer diameter of the heating coils 100, thereby enabling the heating coils 100 to rest within the channels 86 and project generated heat downwardly through the openings toward the surface of the stream of molten glass 20. Alternatively, the heating coils 100 may be cemented within the channels 86 with a refractory mud which is nonreactive with the material of which the heating coils 100 are formed.

As shown best in FIGS. 3 and 5, the upper portion 82 of the inboard portion 62 consists of a substantially solid body of refractory material having a thickness preferably greater than the thickness of the lower portion 84. The upper portion 82 serves to provide physical support to the inboard portion 62, and further presents a thermal insulating barrier to heat generated by the heating coils 100, thereby serving to direct the generated heat primarily downwardly toward the stream of molten glass. Preferably the upper portion 82 is formed of a refractory material with a thermal conductivity which is low and a thickness which is sufficient to direct greater than about seventy-five percent of the generated heat downwardly.

The heating coils 100, as previously noted, are mounted in the channels 86 in two independent sets, an inboard set 88 and an outboard set 90. Outboard set 90 is preferably positioned over and in close proximity to the surface of the marginal edge portion of the stream of molten glass adjacent the sidewall 26, and inboard set 88 is preferably positioned between the outboard set 90 and the central portion of the stream of molten glass 20. Inboard set 88 and outboard set 90 are independently powerable through power supply leads 102 and 104, respectively, to provide a selective heating capacity to the heater 50. Preferably, in keeping with the purpose of the invention to diminish the nonuniform transverse temperature profile, the inboard set 88 is operated to generate heat at a first rate and the outboard set 90 is operated to generate heat at a second and greater rate.

As best shown in FIG. 4, inboard set 88 and outboard set 90 are each provided with temperature sensing devices i.e., thermocouples 106 and 108, respectively. Preferably the thermocouples 106 and 108 are slidably adjustable in position within the housing member 60 and are electrically connected to a control device (not shown) to maintain the operating temperature of the heating coils 100 within a preselected temperature range, e.g., below about 2900° F. (1600° C.).

Referring to FIGS. 3 and 4, there is also shown a pair of cavities 110 disposed in the outer surface of the outboard portion 66 which may be conveniently utilized to receive handling rods or members (not shown) for handling and repositioning the heater 50 along the sidewall 26.

In a preferred embodiment of the present invention wherein the heater 50 is positioned in the conditioner region 10 or the canal region 12, the heating coils 100 are preferably formed in a helical configuration from 0.06 inch (1.5 cm) platinum/rhodium alloy wire. Platinum composition may be between about 60–100 percent and rhodium composition between about 0 to 40 percent. Preferably a 90% platinum, 10% rhodium alloy is selected. This particular wire composition is preferred because it is compatible with the high temperature operating conditions to which it is subjected, and is further compatible with the oxidizing atmosphere which is generally present in the conditioner region 10 and the canal region 12. Preferably both the inboard set 88 and the outboard set 90 of heating coils 100 are formed with a capacity to generate heat at a rate of about 15 kilowatts (50,000 BTU/hr.) when operated under direct current conditions of about 122 volts, and 256 amps, thereby providing total heat generation capacity of about 30 kilowatts (100,000 BTU/hr.). Although not limiting to the invention, preferably the operating temperature of the heater 50 is maintained below about 2700° F. (1475° C.)

As previously mentioned, the heater 50 may also be advantageously utilized in the forming chamber 16 to flatten the transverse temperature profile of the stream of molten glass 20 therein. However, due to the reducing atmosphere which is generally mandated in the forming chamber 16, it is preferred to utilize molybdenum, tungsten, or alloys thereof in place of the platinum-rhodium wire which was utilized in the oxidizing atmosphere of the conditioner region 10 and canal region 12. Further, the housing member 60 is preferably elongated for use in the forming chamber 16 to span the uncovered edges of the pool of molten metal 38 and position the inboard set 88 and outboard set 90 of heating coils 100 in proper position adjacent the marginal edge portion of the stream of molten glass 20.

Although not limiting to the invention, and with reference to FIGS. 3 and 6, in operation an individual heater 50 may be utilized to downwardly direct an outboard heat ray pattern 112 from the outboard set 90 of heating coils 100 toward a first distinct planar heating area 114 (shown only in FIG. 6) of the marginal edge portion and to downwardly direct an inboard heat ray pattern 116 from the inboard set 88 of heating coils 100 toward a second distinct planar heating area 118 (shown only in FIG. 6) of the marginal edge portion. In this manner, as shown in FIG. 6, first and second distinct planar heating areas 114 and 118 are provided over the marginal edge portion. With reference to FIG. 5, each of the heat ray patterns 112 and 116 include (as shown for pattern 116 in FIG. 5) a series of heat ray cones 119, one for each of the heating coils 100. The heat ray cones 119 preferably overlap at the surface of the glass stream 20 to provide planar heating areas 114 and 118. Although not preferred, planar heating areas 114 and 118 may overlap to a limited degree.

As before mentioned, the common transverse temperature profile existing in the glass stream 20 includes a higher central temperature, a cooler marginal edge temperature, and a generally smooth temperature gradient therebetween. It is preferred in such a case to generate heat with the outboard set 90 of heating coils 100 at a rate which exceeds the rate of heat generation of the inboard set 88, i.e., to operate planar heating area 114 at a greater temperature than planar heating area 118, to thereby counter the outwardly decreasing temperature profile of the glass stream 20 with an outwardly increasing series of localized planar heating zones generated by the heater 50. The inboard and outboard planar heating areas 114 and 118 may be independently tailored to produce a desired effect upon a particular stream 20 by adjusting the relative preselected rates of heat generation of the inboard set 88 and the outboard set 90 of heating coils 100, as well as by altering the spacing between the heater 50 and the surface of the glass stream 20.

With reference to FIGS. 2 and 6, a plurality of heaters 50 positioned adjacent one another along opposed marginal edges of the stream 20 may be utilized cooperatively to create a first set of opposed, longitudinally elongated outboard bands 120 of concentrated heating, and a second set of opposed, longitudinally elongated inboard bands 122 of concentrated heating along the surface of the stream 20. Outboard bands 120 correspond generally to a continuum of the first distinct planar heating areas 114 created by the plurality of outboard sets 90 of heating coils 100, and inboard bands 122 correspond generally to a continuum of the second distinct planar heating areas 118 created by the plurality of inboard sets 90 of heating coils 100.

In a preferred manner of practicing the present invention the outboard bands 120 and inboard bands 122 are independently controlled and coordinated with the central region cooling effect provided by coolers 52 to create a glass stream 20 at the downstream end of the canal region 12 which exhibits a substantially flat transverse temperature profile, a condition which may be preferred during passage through the delivery facility 14 into the forming chamber 16. For example, because it is generally desirable for the stream 20 to cool to a certain extent overall as it passes through the canal region 12, the plurality of outboard sets 90 of heating coils 100 may be controlled to provide generally decreasing-temperature outboard bands 120 when viewed in a downstream direction. The plurality of inboard sets 88 of heating coils 100 would also be controlled to provide generally decreasing-temperature inboard bands 122 when viewed in a downstream direction. The inboard bands 122 at any location along their longitudinal dimension would preferably operate at a lesser temperature than the corresponding outboard band 120, at the same longitudinal location, in order to maintain control over the transverse temperature profile of the stream 20.

Of course it will be appreciated that the present invention is not limited to only a first and second heating element for providing first and second distinct planar heating areas, but rather, includes any plurality of heating elements operating in accordance with the present invention, as set forth in the claims which follow.

I claim:
1. In a method of passing a stream of molten glass through a chamber having side walls, a roof and a bottom, wherein heat losses along the side walls cause the glass stream to cool more rapidly in side portions than in center portions, the improvement comprising:
   directing heat at a first rate onto the surface of a first side portion of the glass stream adjacent to a side wall from a first horizontally extending array of electrical heater elements spaced closely above the glass surface;
   directing heat at a second rate lower than the first rate onto the surface of a second side portion of the glass stream between the first side portion and the center of the stream from a second horizontally extending array of electrical heater elements spaced closely above the glass surface; and
   reflecting heat from the first and second heater arrays downwardly by means of a heat reflecting member above the heater arrays and spaced below the roof of the chamber;
whereby thermal uniformity in the direction transverse to the direction of glass motion is improved.

2. The method of claim 1 wherein at least 75 percent of the heat from the first and second heater arrays is directed downwardly toward the glass surface.

3. The method of claim 1 wherein the reflecting member serves to additionally provide a thermal insulating barrier immediately above the first and second heater arrays.

4. The method of claim 1 wherein the first and second heater arrays are spaced less than about 3 inches (7.6 centimeters) from the glass surface.

5. The method of claims 1, 2, 3 or 4 wherein the chamber comprises a conditioner region of a glass melting furnace.

6. The method of claims 1, 2, 3 or 4 wherein the chamber comprises a canal region interconnecting a glass melting furnace and a glass forming chamber.

7. The method of claims 1, 2, 3 or 4 wherein the chamber comprises a float glass forming chamber.

8. The method of claim 1 comprising heating side portions of the glass stream with a plurality of the first and second heating elements at a plurality of locations along opposite side walls of the chamber so as to provide first and second elongated bands of localized heating along both side portions of the glass stream.

9. The method of claim 1 or 8 wherein center portions of the glass stream are permitted to lose heat to the environment above the glass stream within the chamber.

10. The method of claim 9 wherein center portions of the glass stream are cooled by means of coolers within the chamber.

11. In a chamber through which a stream of molten glass flows from a melting section of a furnace to a forming chamber, having opposed side walls, a roof and a bottom, means for improving lateral thermal uniformity of the glass stream comprising: edge heater means extending horizontally from the side walls and overlying side portions of the molten glass in the chamber at an elevation above and closely adjacent to the level of molten glass in the chamber; each edge heater means including:

a substantially planar horizontal refractory heat reflector member spaced below the chamber roof, first and second horizontally extending arrays of electrical heating elements supported below the reflector member, the first and second arrays being spaced apart laterally with respect to the direction of glass flow, with the first array adjacent to the side wall and the second array toward the center of the chamber, first and second electrical leads independently connecting the first and second arrays to independently controllable electrical power sources.

12. The apparatus of claim 11 wherein the electrical heater elements of the first and second arrays comprise electrical resistance coils, the axes of which extend substantially horizontally.

13. The apparatus of claim 11 further including temperature sensing means associated with the first heater array and independent temperature sensing means associated with the second heater array.

14. The apparatus of claim 11 or 12 wherein the reflector member includes a plurality of downwardly open elongated channels within which are received the heating elements of the first and second heater arrays.

15. The apparatus of claim 14 wherein the heat reflecting member is additionally a thermal insulation barrier.

16. The apparatus of claim 11 wherein each edge heater includes a horizontally extending portion that extends through a side wall of the chamber so as to cantilever the edge heater over the glass stream.

17. The apparatus of claim 11 wherein a plurality of the edge heaters extend from opposite side walls of the chamber.

18. The apparatus of claim 11 or 17 further including means for cooling center portions of the glass stream within the chamber.

19. The apparatus of claim 11 or 17 wherein the chamber comprises a conditioner region of a glass melting furnace.

20. The apparatus of claim 11 or 17 wherein the chamber comprises a canal region interconnecting a glass melting furnace and a glass forming chamber.

* * * * *